(12) United States Patent
Bors et al.

(10) Patent No.: US 11,097,279 B2
(45) Date of Patent: Aug. 24, 2021

(54) DISPOSAL WITH SENSOR AND LIGHT SYSTEM

(71) Applicant: Moen Incorporated, North Olmsted, OH (US)

(72) Inventors: Mark S. Bors, Grafton, OH (US); Russell A. Ferqueron, North Olmsted, OH (US); Kevin A. Lumby, Olmsted Township, OH (US); Thomas Joseph Manion, Broadview Heights, OH (US); Stephen R. Norgrove, Wadsworth, OH (US)

(73) Assignee: FB Global Plumbing Group LLC, North Olmsted, OH (US)

( * ) Notice: Subject to any disclaimer, the term of this patent is extended or adjusted under 35 U.S.C. 154(b) by 348 days.

(21) Appl. No.: 16/263,577

(22) Filed: Jan. 31, 2019

(65) Prior Publication Data

US 2019/0308198 A1    Oct. 10, 2019

Related U.S. Application Data

(60) Provisional application No. 62/653,184, filed on Apr. 5, 2018.

(51) Int. Cl.
| | |
|---|---|
| *B02C 18/00* | (2006.01) |
| *H05B 45/00* | (2020.01) |
| *F21V 23/00* | (2015.01) |
| *G05B 11/00* | (2006.01) |
| *G05B 11/01* | (2006.01) |

(52) U.S. Cl.
CPC ........ *B02C 18/0084* (2013.01); *F21V 23/003* (2013.01); *G05B 11/01* (2013.01); *H05B 45/00* (2020.01)

(58) Field of Classification Search
CPC ..................................................... G05B 11/01
See application file for complete search history.

(56) References Cited

U.S. PATENT DOCUMENTS

| | | |
|---|---|---|
| 5,253,376 A | 10/1993 | Fait |
| 5,580,155 A | 12/1996 | Hildebrand et al. |
| 5,893,627 A | 4/1999 | Tague |
| 7,303,299 B2 | 12/2007 | Theus |
| 8,360,590 B2 | 1/2013 | Carter |
| 8,408,728 B2 | 4/2013 | Fuentes et al. |
| 2004/0251339 A1* | 12/2004 | Strutz ............... E03C 1/2665 241/30 |
| 2006/0176697 A1 | 8/2006 | Arruda |
| 2013/0327860 A1 | 12/2013 | Harooni |
| 2014/0259376 A1 | 9/2014 | Turner |
| 2015/0202633 A1 | 7/2015 | Perkins |
| 2015/0369471 A1* | 12/2015 | Williams ............ F21V 33/0044 241/46.014 |
| 2020/0284011 A1* | 9/2020 | Liu ..................... B02C 18/0084 |

* cited by examiner

*Primary Examiner* — Anh Q Tran

(74) *Attorney, Agent, or Firm* — Calfee, Halter & Griswold LLP

(57) ABSTRACT

The present invention provides a disposal with sensor and light system where a sensor detects a presence of a user in one area near the disposal and a light illuminates another area near the disposal.

20 Claims, 18 Drawing Sheets

DISPOSAL WITH SENSOR AND LIGHT SYSTEM

CROSS-REFERENCE TO RELATED APPLICATION

This application claims the benefit of U.S. Provisional Application No. 62/653,184, filed Apr. 5, 2018, the entire disclosure of which is hereby incorporated by reference.

FIELD

The present invention relates generally to a disposal with sensor and light system and, more particularly, to a disposal with sensor and light system where a sensor detects a presence of a user in one area near the disposal and a light illuminates another area near the disposal.

BACKGROUND

Disposals with sensors and lights are known. These disposals have various drawbacks. Consumers desire a disposal that eliminates these drawbacks.

SUMMARY

The present invention provides a sensor and light system for a disposal.

In an exemplary embodiment, the sensor and light system comprises a shell, a collar, a sensor assembly, and a light assembly. The shell is operable to cover a portion of a disposal. The shell includes a track. The track extends around a circumference of the shell. The collar is operable to rotate in the track of the shell. The collar includes a sensor portion and a light portion. The sensor assembly is operable to sense the presence of a user in a sensing zone in a first area near the disposal. The sensor assembly is operable to connect to the sensor portion of the collar. The light assembly is operable to illuminate a second area near the disposal. The light assembly is operable to connect to the light portion of the collar. By rotating the collar in the track of the shell, the sensor assembly can be aimed at the first area near the disposal and the light assembly can be aimed at the second area near the disposal.

In an exemplary embodiment, the sensor and light system comprises a shell, a collar, a sensor assembly, and a light assembly. The shell is operable to cover a portion of a disposal. The shell includes a track. The track extends around a circumference of the shell. The collar is operable to rotate in the track of the shell. The collar includes a sensor portion and a light portion. The sensor assembly is operable to sense the presence of a user in a sensing zone in a first area near the disposal. The sensor assembly is operable to connect to the sensor portion of the collar. The light assembly is operable to illuminate a second area near the disposal. The light assembly is operable to connect to the light portion of the collar. The sensor assembly is spaced apart from the light assembly. The sensor assembly and the light assembly can be aimed at different locations around the disposal.

In an exemplary embodiment, the sensor and light system comprises a shell, a collar, a sensor assembly, and a light assembly. The shell is operable to cover a portion of a disposal. The shell includes a track. The track extends around a circumference of the shell. The collar is operable to rotate in the track of the shell. The collar includes a sensor portion and a light portion. The sensor portion includes a battery compartment. The sensor assembly is operable to sense the presence of a user in a sensing zone in a first area near the disposal. The sensor assembly is operable to connect to the sensor portion of the collar. The light assembly is operable to illuminate a second area near the disposal. The light assembly is operable to connect to the light portion of the collar. When the collar is rotated in the track of the shell, the battery compartment moves around the disposal with the sensor assembly.

BRIEF DESCRIPTION OF THE DRAWINGS

—FIG. 1a is a front-left side perspective view, and FIG. 1b is a rear-right side perspective view;

-FIG. 4a is a front-left side perspective view, and FIG. 4b is a rear-right side perspective view;

-FIG. 5a is a rear-right side perspective view, and FIG. 5b is a front-left side perspective view;

—FIG. 7a is a front-left side perspective view, and FIG. 7b is a rear-right side perspective view;

—FIG. 8a is a front-left side perspective view, and FIG. 8b is a rear-right side perspective view;

-FIG. 9a is a front-left side perspective view, and FIG. 9b is a rear-right side perspective view;

-FIG. 10a is a top plan view without batteries, FIG. 10b is a partial top plan view without batteries, FIG. 10c is a top plan view with batteries, and FIG. 10d is a partial top plan view with batteries;

-FIG. 11a is a front-left side perspective view, and FIG. 11b is a rear-right side perspective view;

-FIG. 12a is a rear-right side perspective view, and FIG. 12b is a front-left side perspective view;

-FIG. 13a is a front-left side perspective view, and FIG. 13b is a rear-right side perspective view;

-FIG. 15a is a front-right side perspective view, and FIG. 15b is a rear-left side perspective view.

DETAILED DESCRIPTION

The present invention provides a disposal with sensor and light system where a sensor detects a presence of a user in one area near the disposal and a light illuminates another area near the disposal.

Figure 1A:
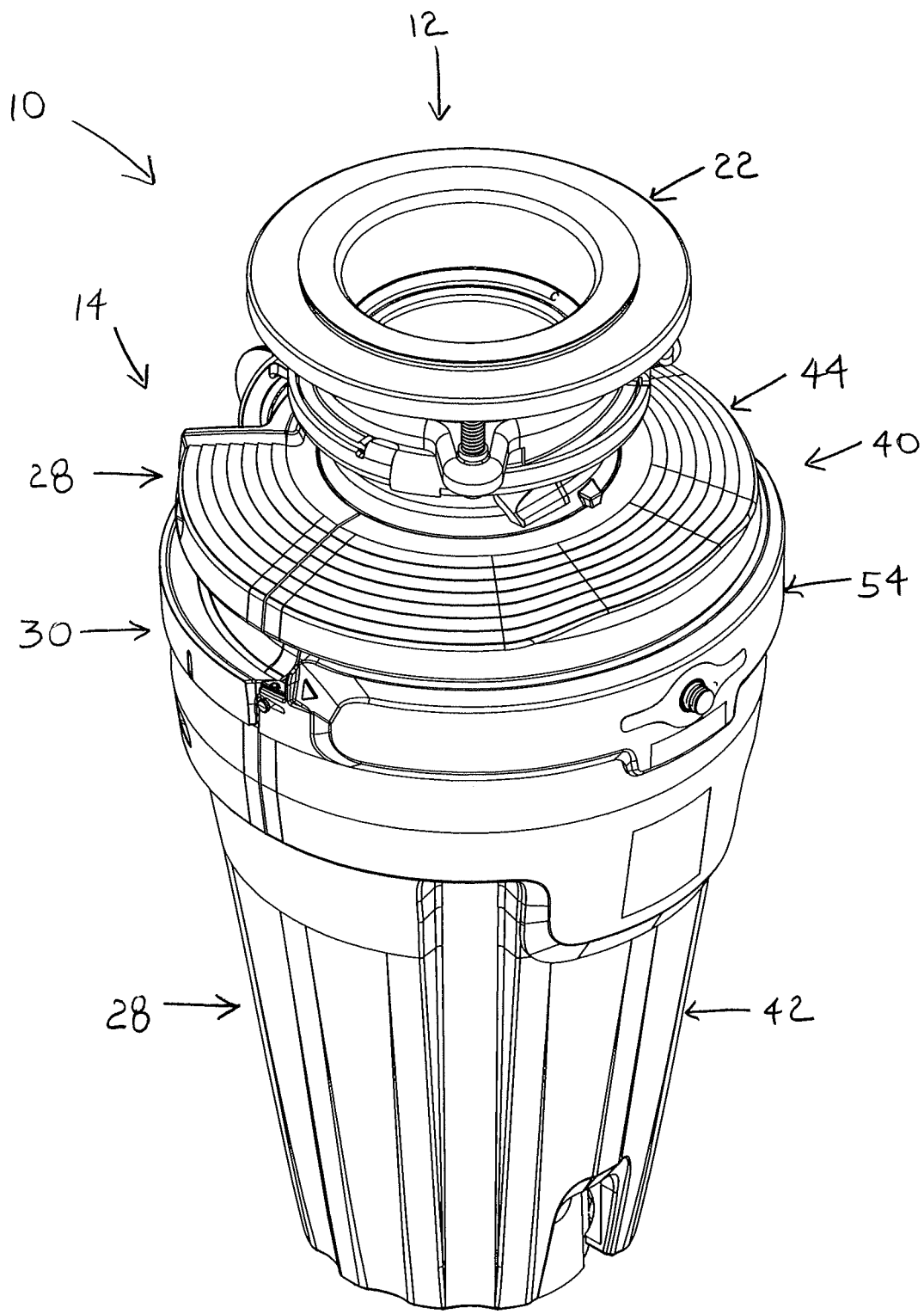
FIGS. 1a-1b are views of a disposal and a sensor and light system according to an exemplary embodiment of the present invention
Figure 1B:
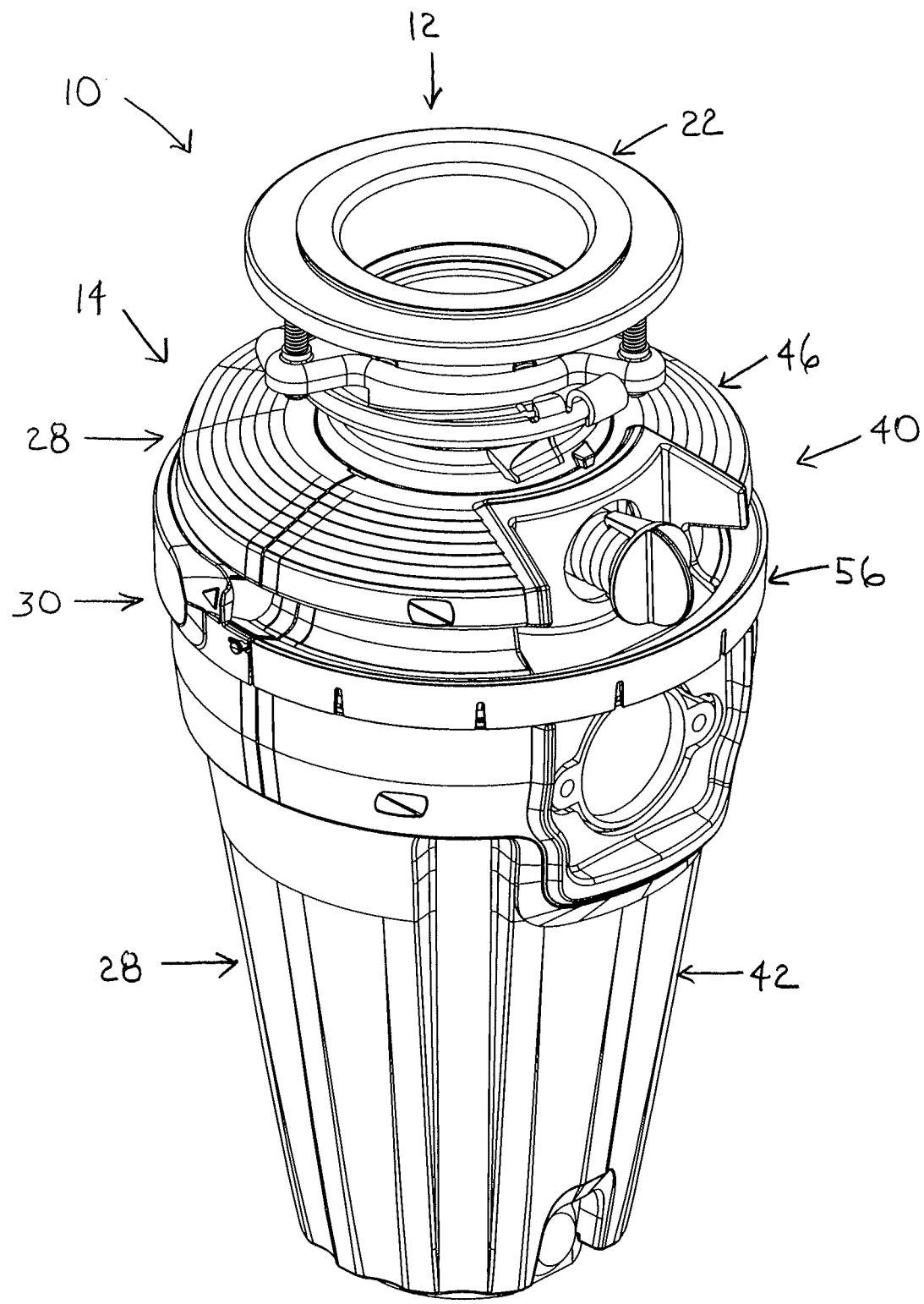
Figure 2:
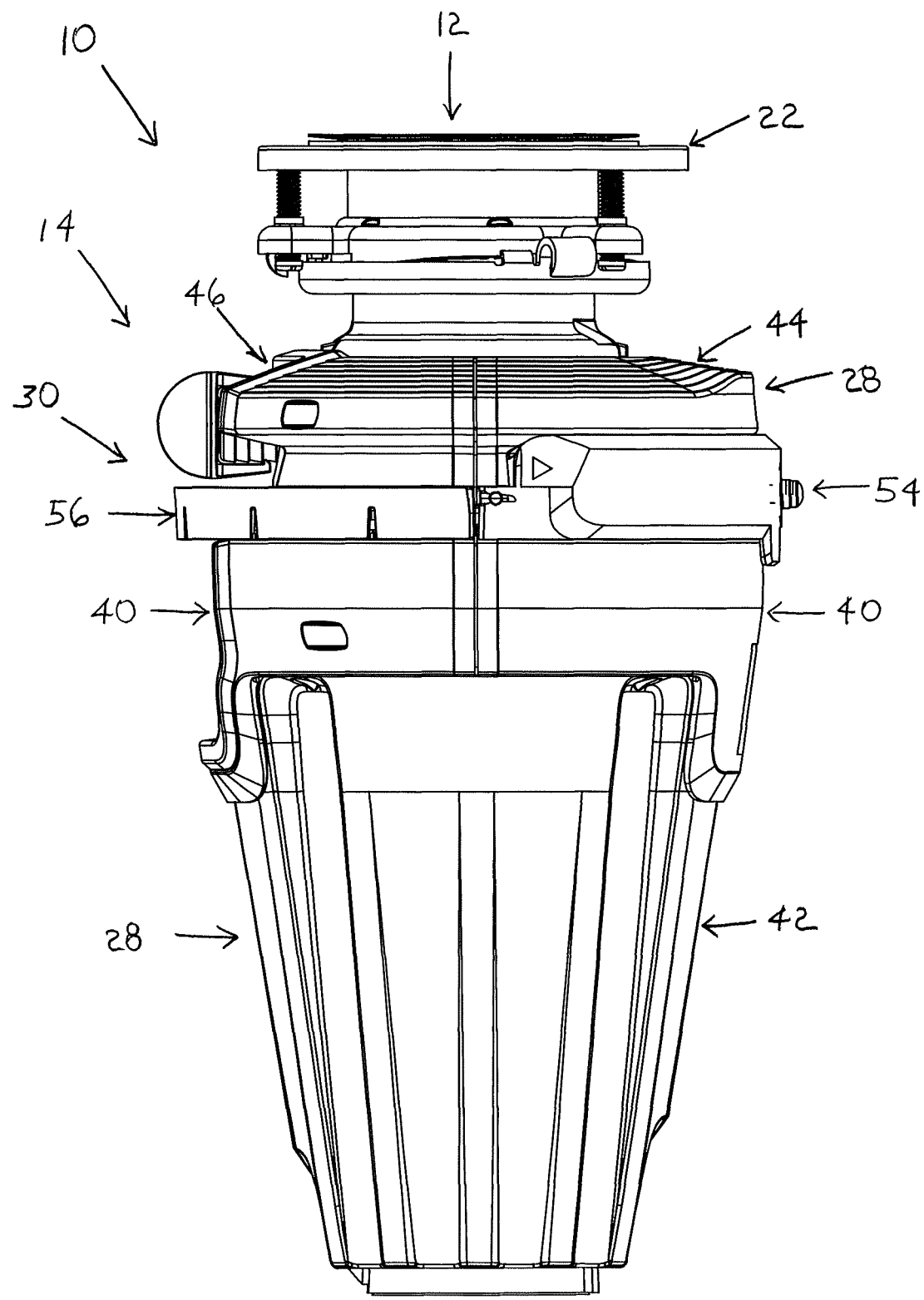
FIG. 2 is a left side elevational view of the disposal and the sensor and light system of FIG. 1.

An exemplary embodiment of a disposal with sensor and light system 10 of the present invention is shown in detail in FIGS. 1a-15. In an exemplary embodiment, as best shown in FIGS. 1a, 1b, and 2, the disposal with sensor and light system 10 includes a disposal 12 and a sensor and light system 14.

Figure 3:
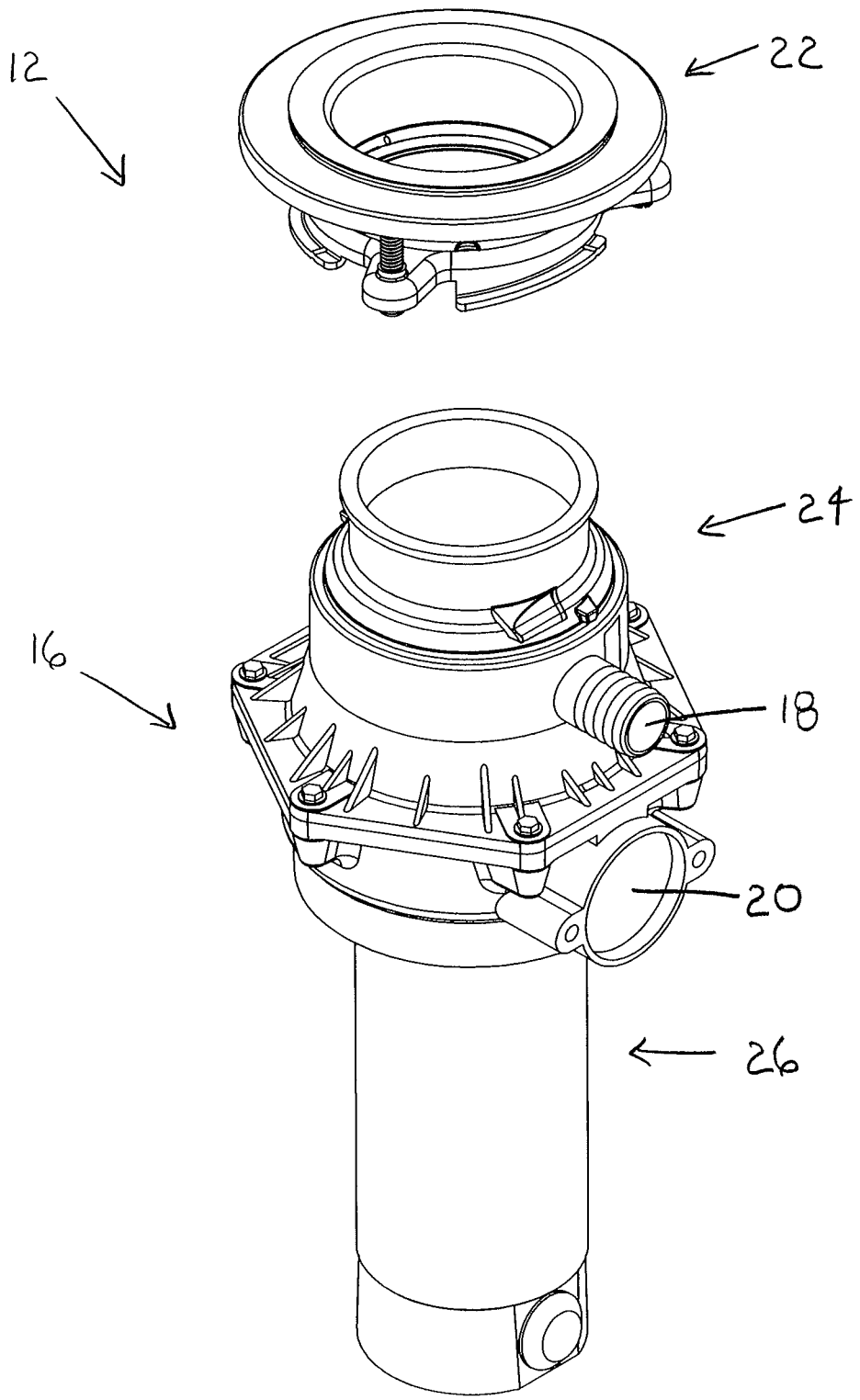
FIG. 3 is an exploded rear-right side perspective view of the disposal of FIG. 1.
Figure 4A:
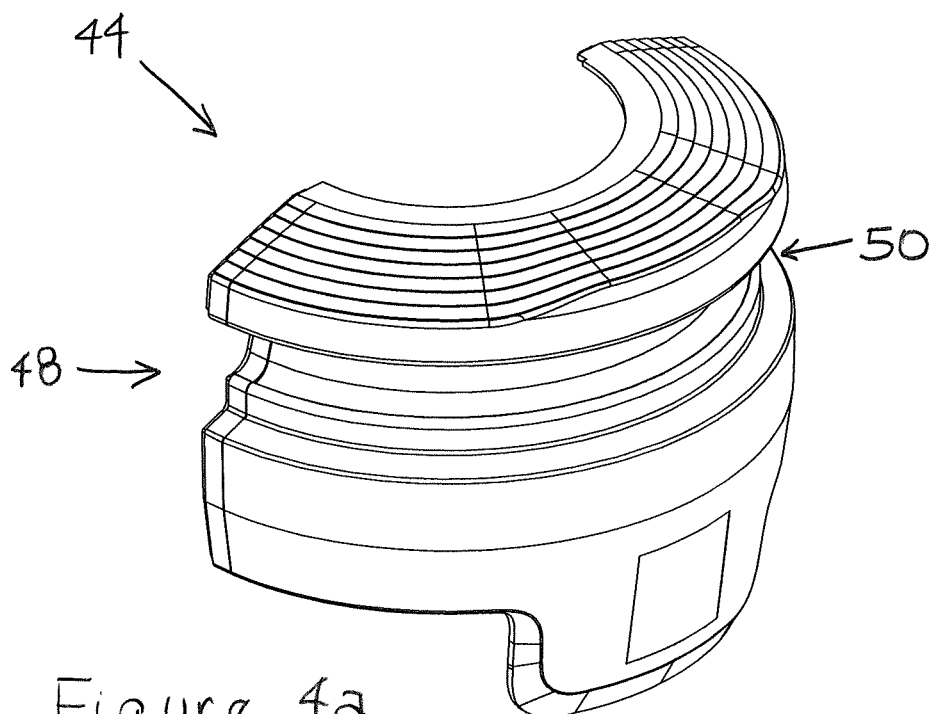
FIGS. 4a-4b are views of a first upper portion of a shell of the sensor and light system of FIG. 1
Figure 4B:
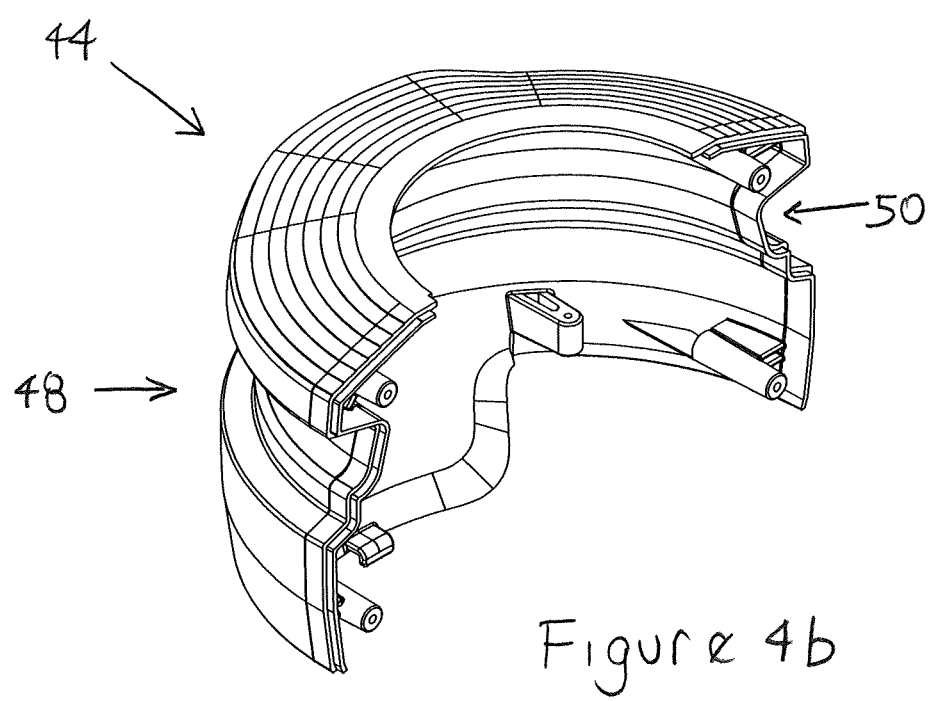
Figure 5A:
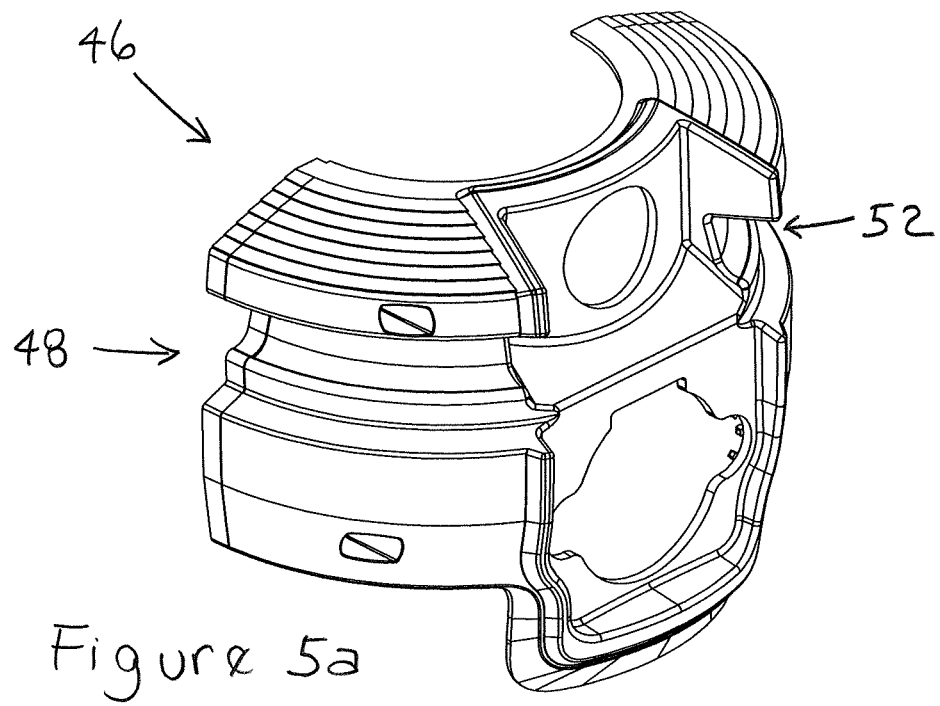
FIGS. 5a-5b are views of a second upper portion of the shell of the sensor and light system of FIG. 1
Figure 5B:
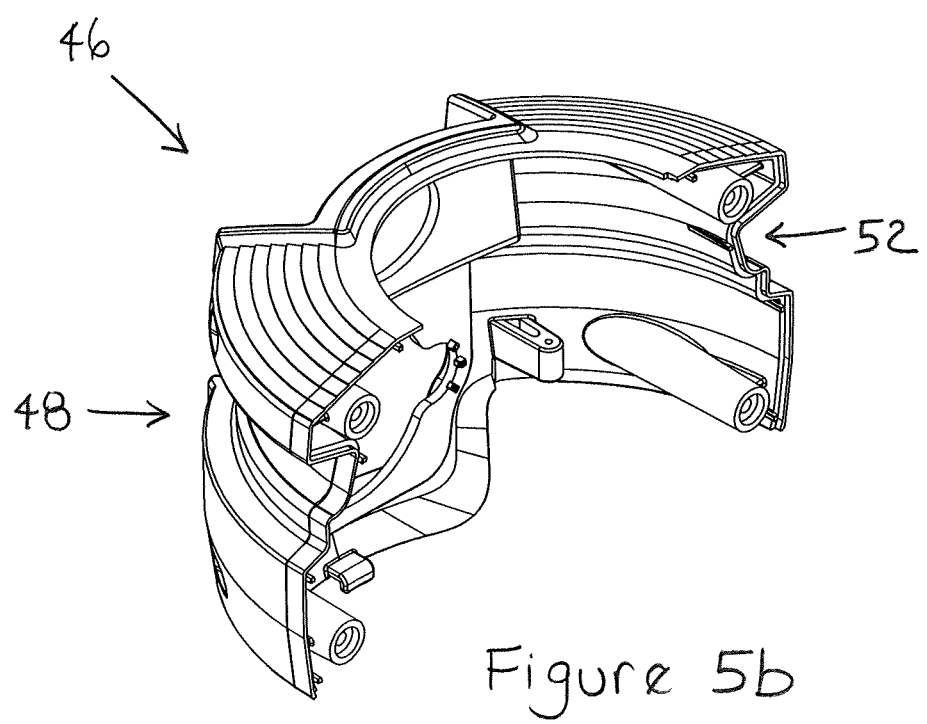
Figure 6:
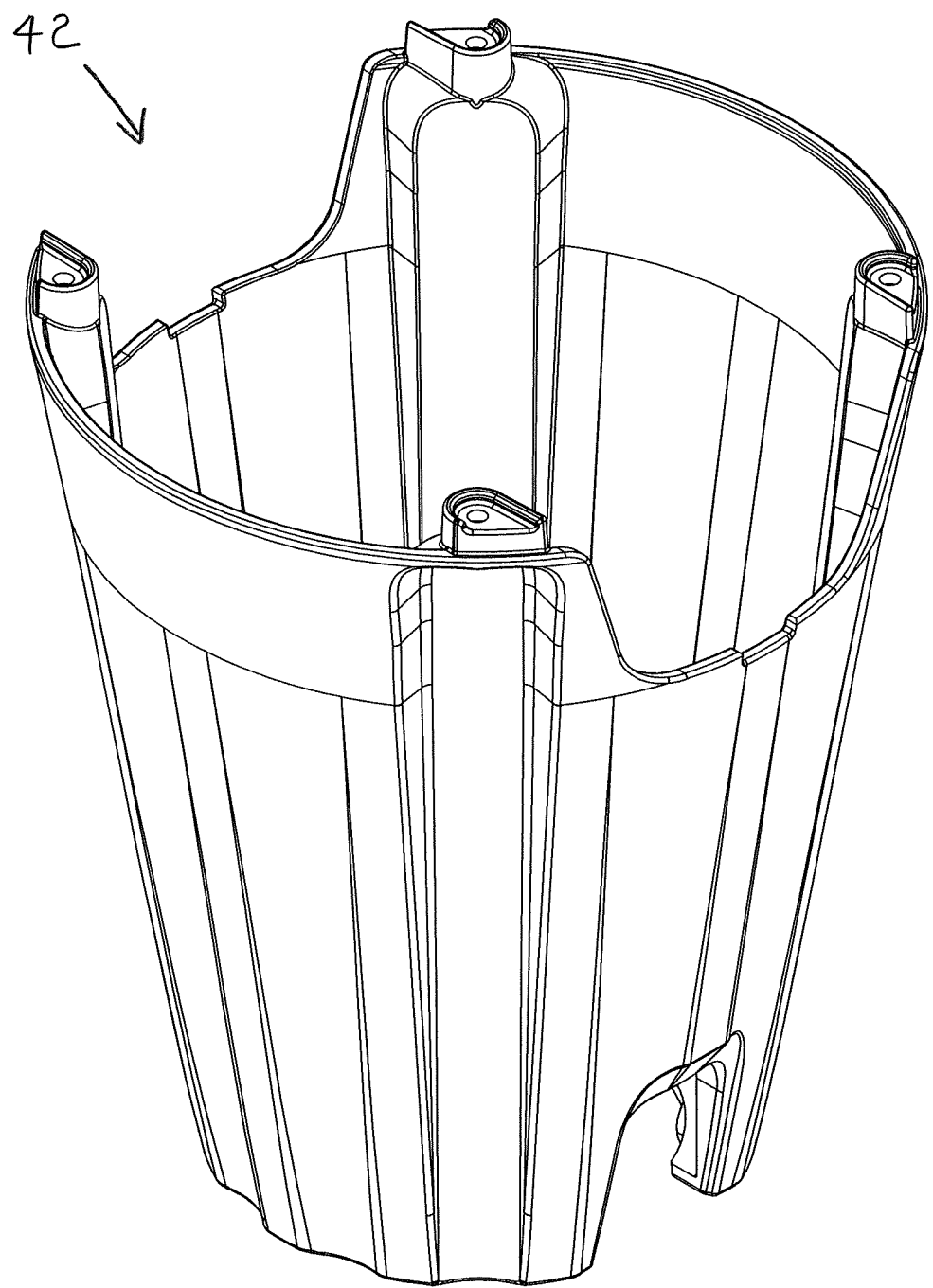
FIG. 6 is a front-left side perspective view of a lower portion of the shell of the sensor and light system of FIG. 1.

In an exemplary embodiment, as best shown in FIG. 3, the disposal 12 includes a housing 16. In an exemplary embodiment, the housing 16 includes an inlet 18, a grind chamber (internal), a motor chamber (internal), and an outlet 20. In an exemplary embodiment, the disposal 12 further includes a grind assembly (internal), a motor assembly (internal), and a mount assembly 22. In an exemplary embodiment, the grind assembly is located in the grind chamber, and the motor assembly is located in the motor chamber. In an exemplary embodiment, the mount assembly 22 is operable to mount the disposal 12 to a drain in a basin. In an exemplary embodiment, the housing 16 further includes an upper portion 24 and a lower portion 26. These components of disposals are well-known in the art and will not be described in greater detail. Only the sensor and light system 14 will be described in greater detail.

In an exemplary embodiment, the sensor and light system 14 includes a shell 28, a collar 30, a sensor assembly 32, a light assembly 34, a power source 36, and a communications/power assembly 38.

In an exemplary embodiment, as best shown in FIGS. 1a, 1b, 2, 4a, 4b, 5a, 5b, and 6, the shell 28 includes an upper portion 40 and a lower portion 42. In an exemplary embodiment, the upper portion 40 of the shell 28 includes a first upper portion 44 and a second upper portion 46. In an exemplary embodiment, the first upper portion 44 and the second upper portion 46 of the shell 28 are operable to connect to and cover the upper portion 24 of the housing 16 of the disposal 12. In an exemplary embodiment, the lower portion 42 of the shell 28 is operable to connect to and cover the lower portion 26 of the housing 16 of the disposal 12. In an exemplary embodiment, the upper portion 40 of the shell 28 includes a track 48. In an exemplary embodiment, the track 48 extends around a circumference of the upper portion 40 of the shell 28. In an exemplary embodiment, the track 48 includes a first track portion 50 and a second track portion 52. In an exemplary embodiment, the first track portion 50 extends around the first upper portion 44 of the shell 28, and the second track portion 52 extends around the second upper portion 46 of the shell 28. In an exemplary embodiment, the track 48 is operable to receive the collar 30.

In an exemplary embodiment, as best shown in FIGS. 1a, 1b, 2, 7a, and 7b, the collar 30 is operable to be received and rotate in the track 48 of the upper portion 40 of the shell 28. In an exemplary embodiment, the collar 30 includes a sensor portion 54 and a light portion 56. In an exemplary embodiment, the sensor portion 54 is generally semi-circular shaped and includes a first end 58 and a second end 60. In an exemplary embodiment, the light portion 56 is generally semi-circular shaped and includes a first end 62 and a second end 64. In an exemplary embodiment, the first end 58 of the sensor portion 54 is operable to connect to the first end 62 of the light portion 56 via a hinge 66. In an exemplary embodiment, the second end 60 of the sensor portion 54 is operable to connect to the second end 64 of the light portion 56 via a screw 68. In an exemplary embodiment, the sensor portion 54 and the light portion 56 are operable to rotate unitarily in the track 48 of the upper portion 40 of the shell 28.

Figure 16:
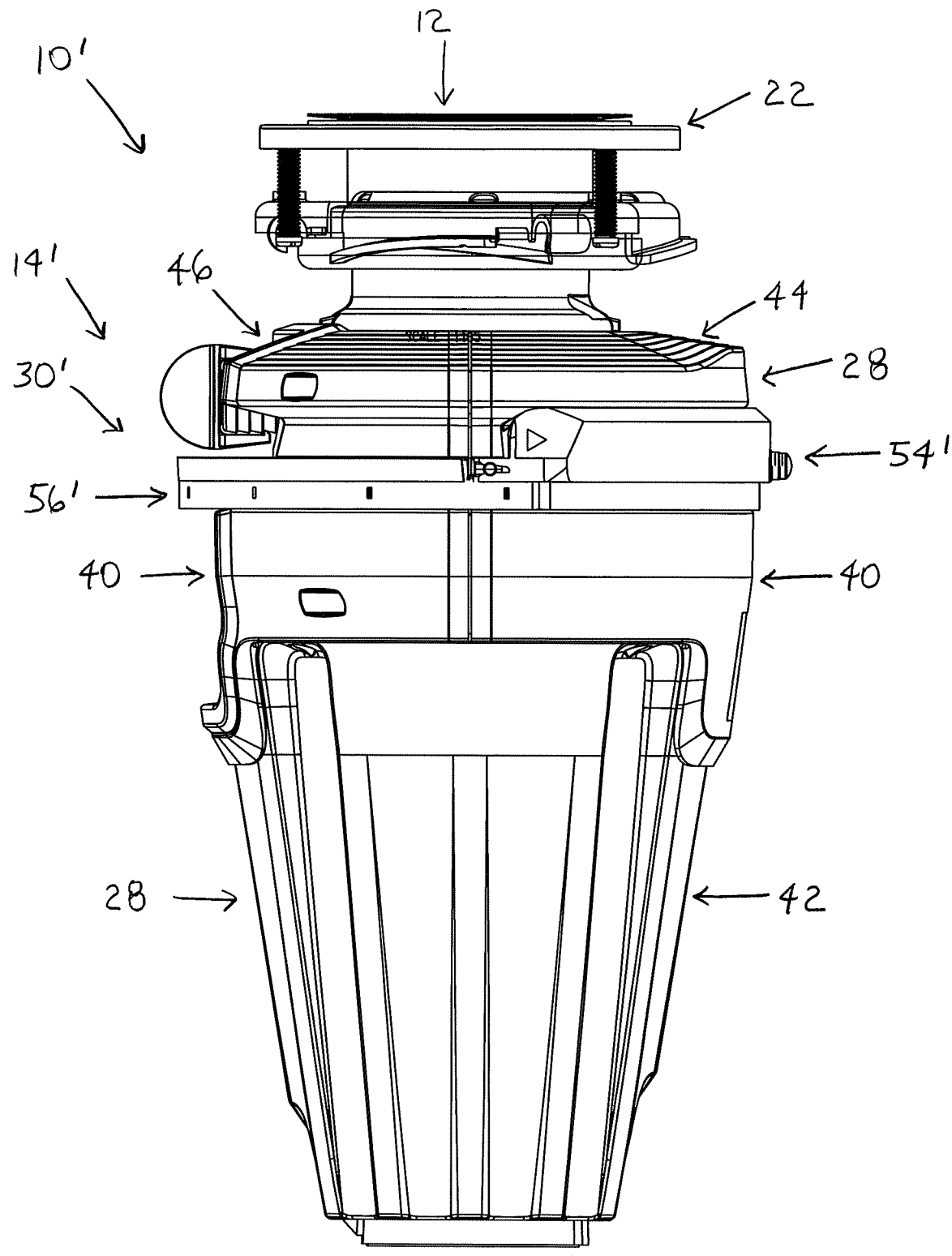
FIG. 16 is a left side elevational view of the disposal and the sensor and light system of FIG. 1 including another exemplary embodiment of the collar.

In another exemplary embodiment, as best shown in FIG. 16, a collar 30' is operable to be received and rotate in the track 48 of the upper portion 40 of the shell 28. In another exemplary embodiment, the collar 30' includes a sensor portion 54' and a light portion 56'. In another exemplary embodiment, the sensor portion 54' is generally circular shaped and includes a first end and a second end. In another exemplary embodiment, the light portion 56' is generally circular shaped and includes a first end and a second end. In another exemplary embodiment, the first end of the sensor portion 54' is operable to connect to the second end of the sensor portion 54', such as via a screw. In another exemplary embodiment, the sensor portion 54' could include a hinge between the first end and the second end to facilitate placement of the sensor portion 54' in the track 48 of the upper portion 40 of the shell 28. In another exemplary embodiment, the first end of the light portion 56' is operable to connect to the second end of the light portion 56', such as via a screw. In another exemplary embodiment, the light portion 56' could include a hinge between the first end and the second end to facilitate placement of the light portion 56' in the track 48 of the upper portion 40 of the shell 28. In another exemplary embodiment, the sensor portion 54' and the light portion 56' are operable to rotate independently in the track 48 of the upper portion 40 of the shell 28.

Figure 7A:
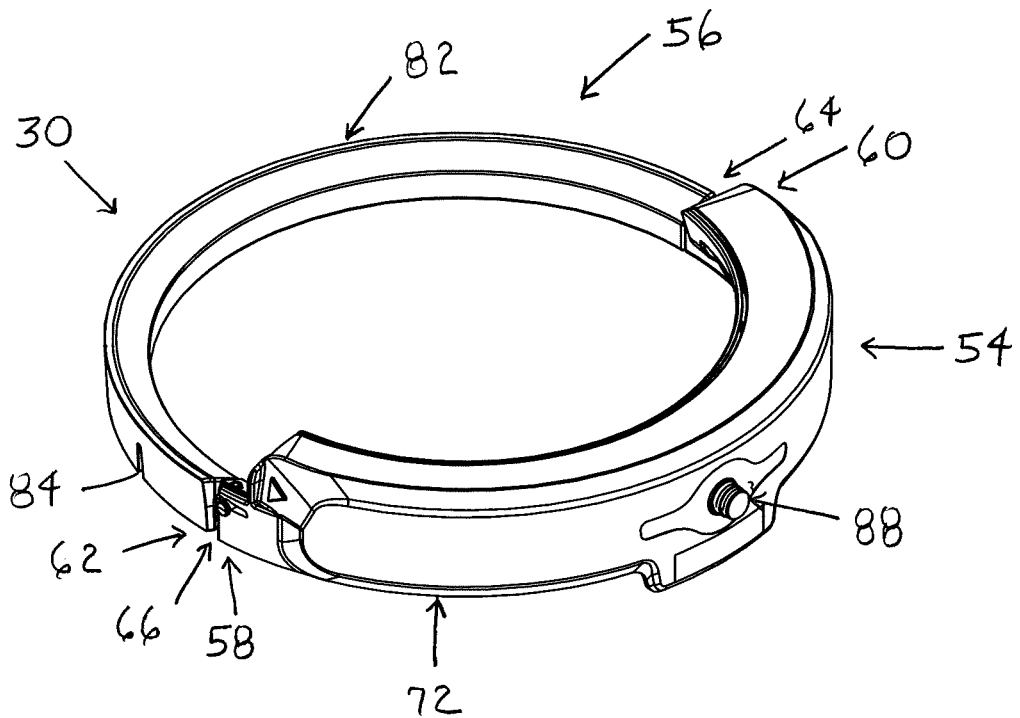
FIGS. 7a-7b are views of the sensor and light system of FIG. 1, excluding the shell
Figure 7B:
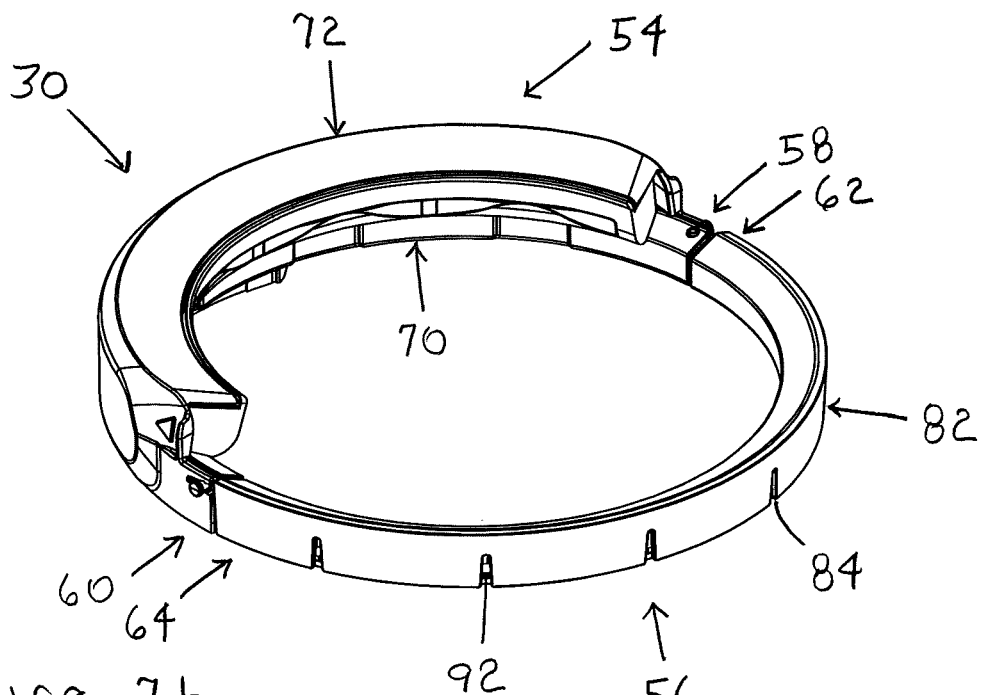
Figure 8A:
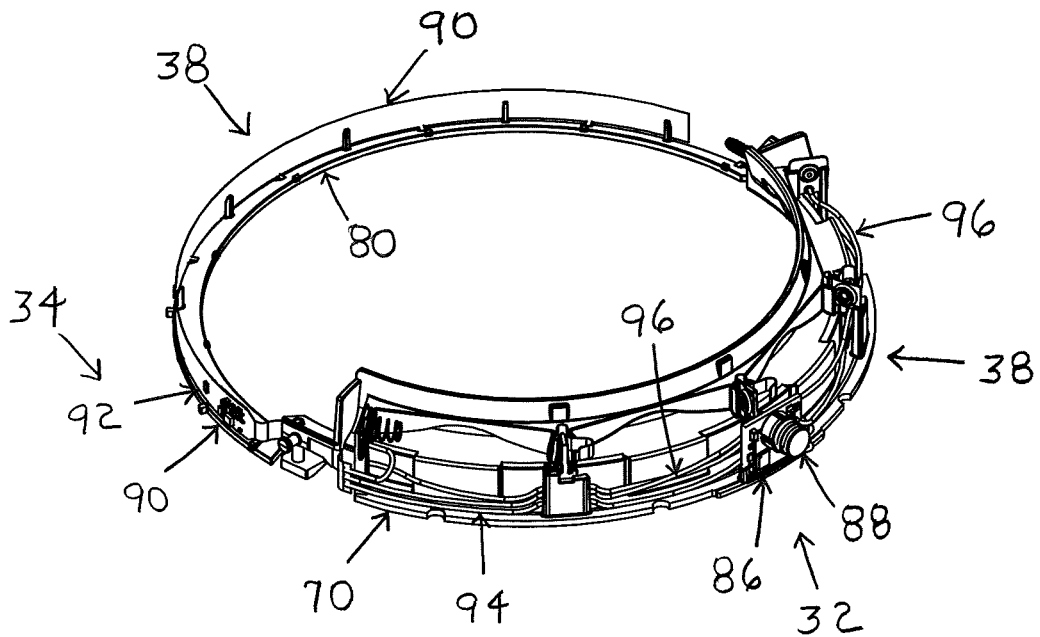
FIGS. 8a-8b are views of the sensor and light system of FIGS. 7a-7b, with a sensor cover and a light cover of a collar removed
Figure 8B:
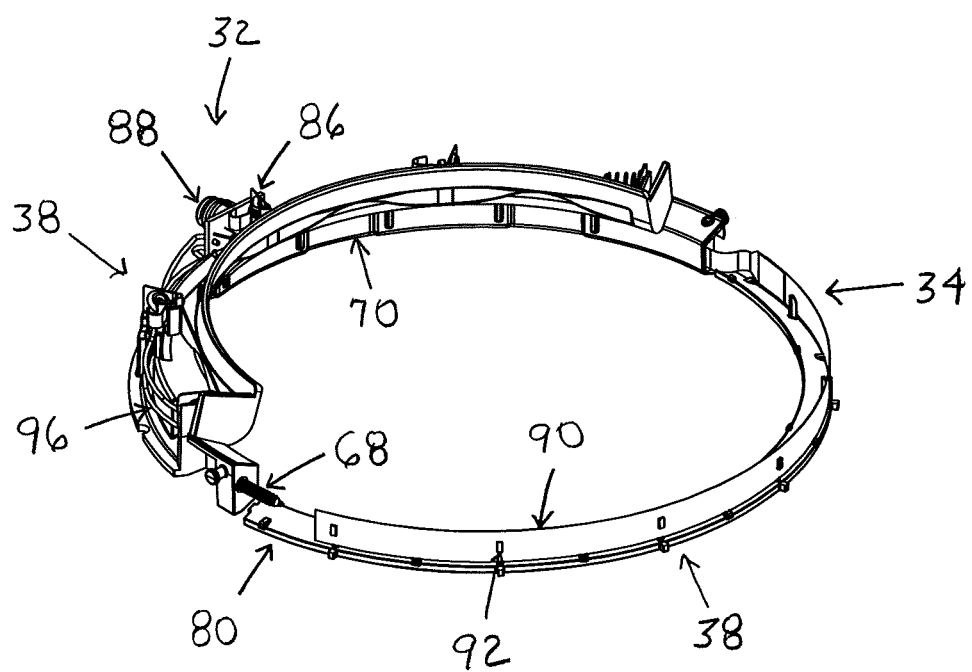
Figure 9A:
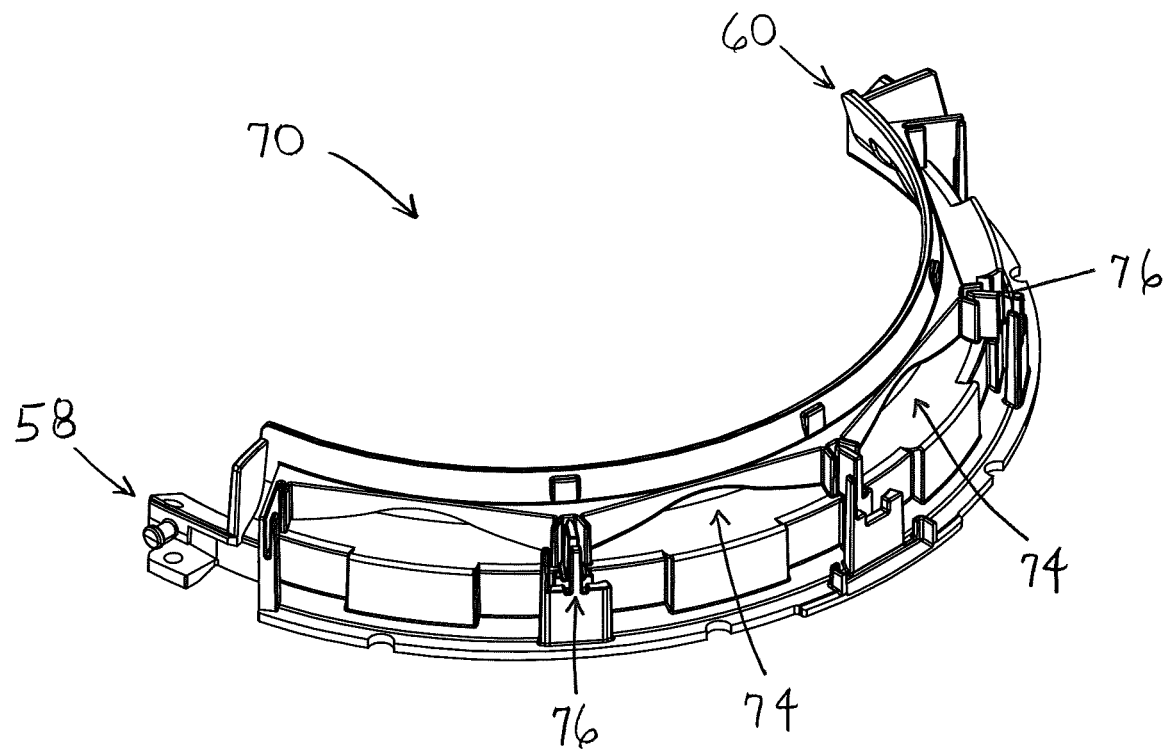
FIGS. 9a-9b are views of a sensor base of the collar of FIGS. 7a-7b
Figure 9B:
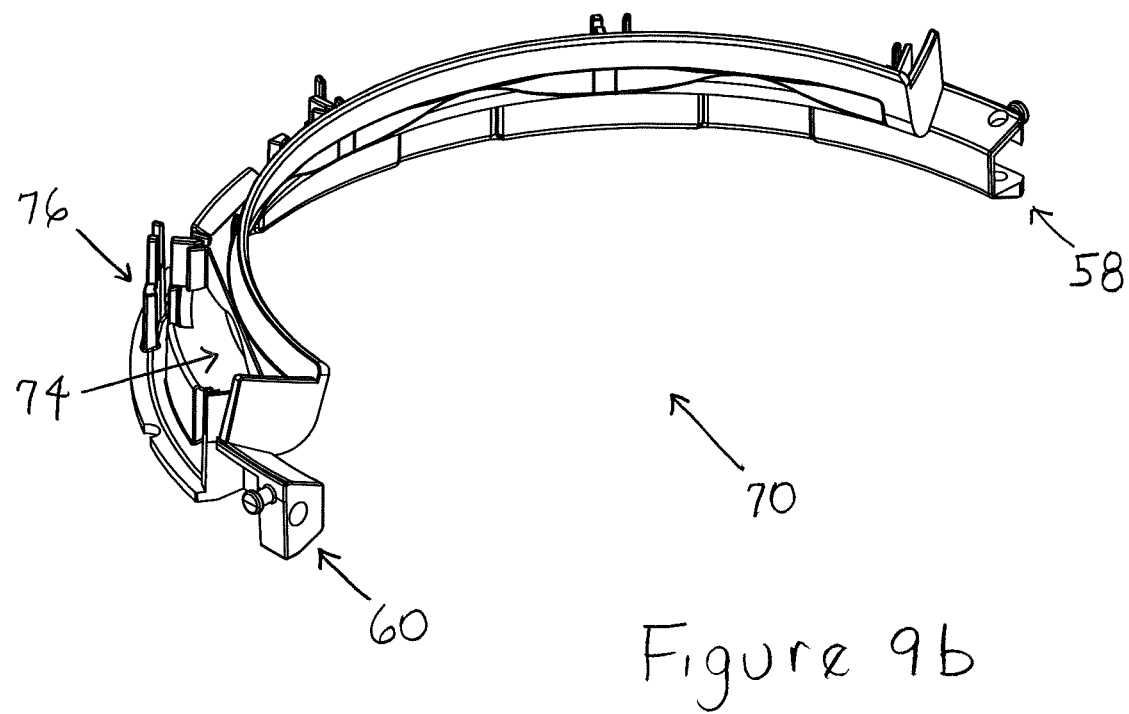
Figure 10A:
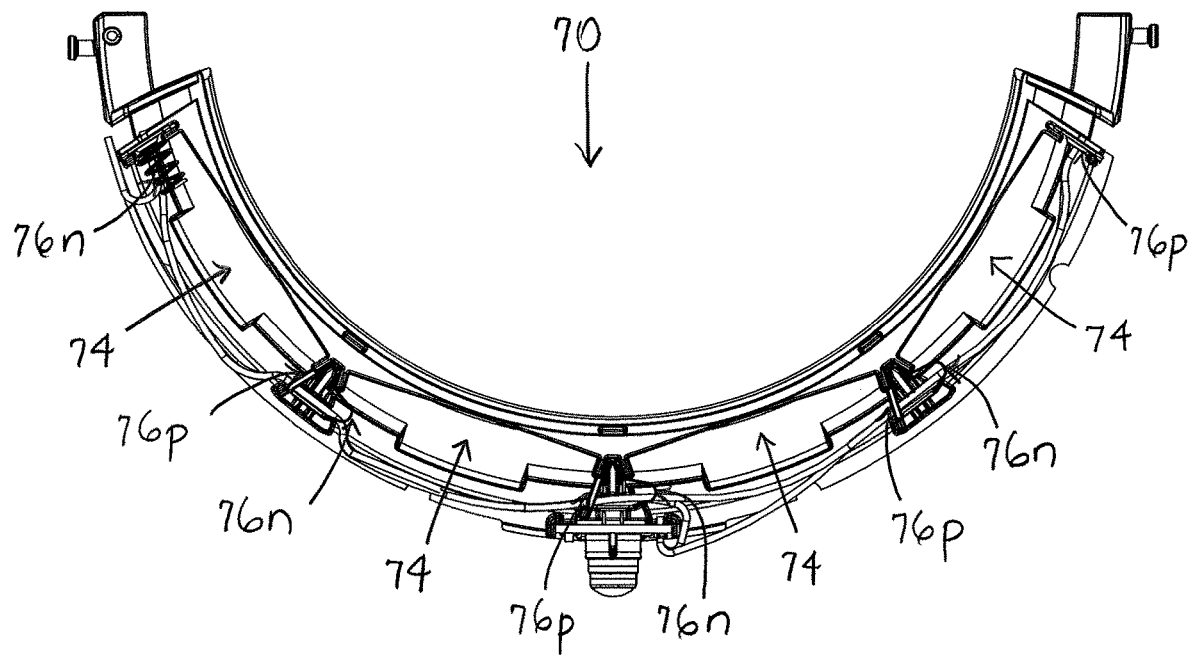
FIGS. 10a-10d are additional views of the sensor base of the collar of FIGS. 7a-7b
Figure 10B:
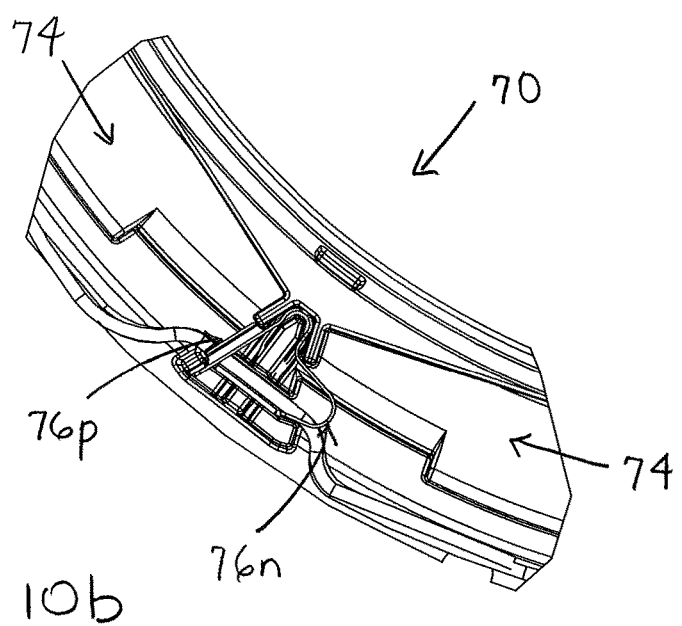
Figure 10C:
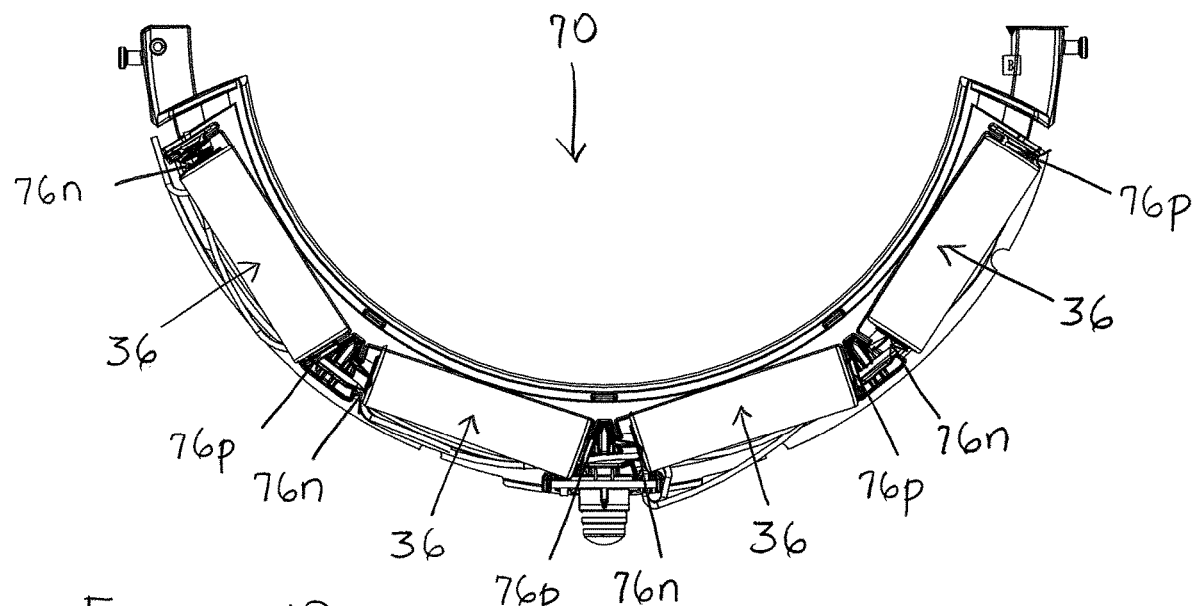
Figure 10D:
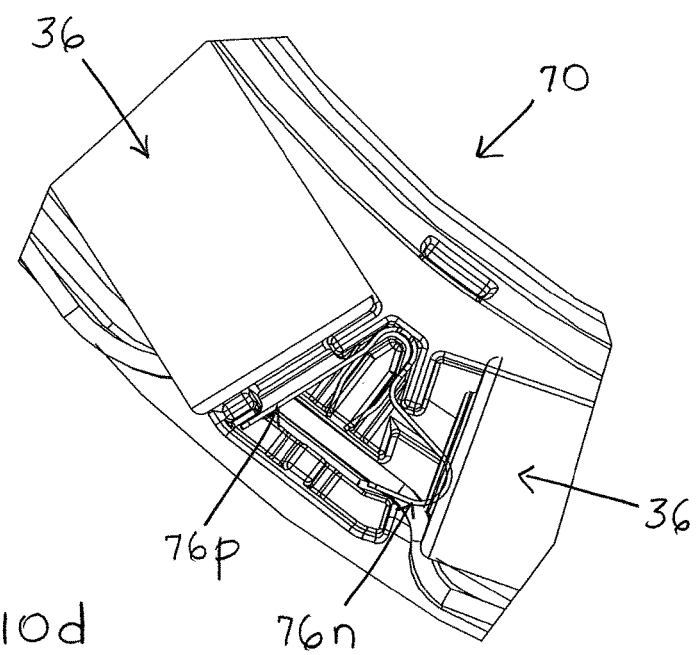

In an exemplary embodiment, as best shown in FIGS. 7a and 7b, the sensor portion 54 of the collar 30 is operable to house the sensor assembly 32 and portions of the communications/power assembly 38. In an exemplary embodiment, the sensor portion 54 of the collar 30 includes a sensor base 70 and a sensor cover 72.

In an exemplary embodiment, as best shown in FIGS. 8a, 8b, 9a, 9b, 10a, 10b, 10c, and 10d, the sensor base 70 is operable to support the sensor assembly 32 and portions of the communications/power assembly 38. In an exemplary embodiment, the sensor base 70 includes a battery compartment 74. In an exemplary embodiment, the battery compartment 74 is generally curved. In an exemplary embodiment, the battery compartment 74 is operable to receive a plurality of batteries. In an exemplary embodiment, the battery compartment 74 is operable to receive four AA batteries. In an exemplary embodiment, the battery compartment 74 includes a plurality of pairs of contacts 76 and, more specifically, a plurality of pairs of positive contacts 76p and negative contacts 76n. In an exemplary embodiment, the battery compartment 74 includes four pairs of positive contacts 76p and negative contacts 76n. In an exemplary embodiment, the pairs of positive contacts 76p and negative contacts 76n are arranged end-to-end, i.e., three positive contacts 76p are adjacent to three negative contacts 76n. In an exemplary embodiment, the three pairs of adjacent positive contacts 76p and negative contacts 76n are angled relative to each other.

Figure 11A:
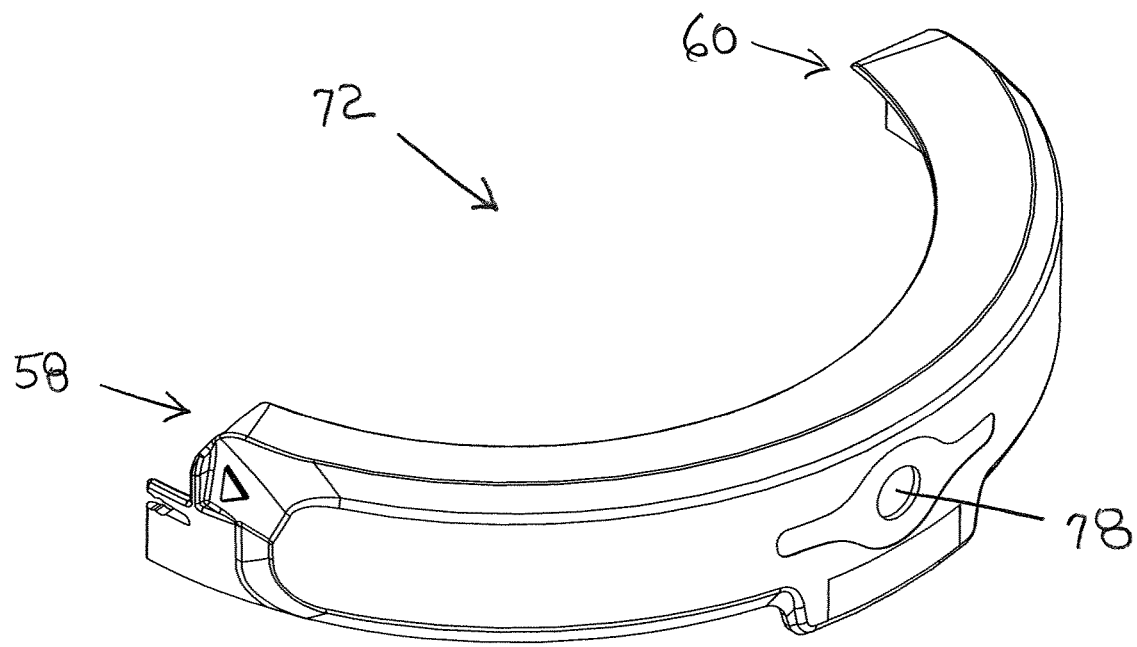
FIGS. 11a-11b are views of the sensor cover of the collar of FIGS. 7a-7b
Figure 11B:
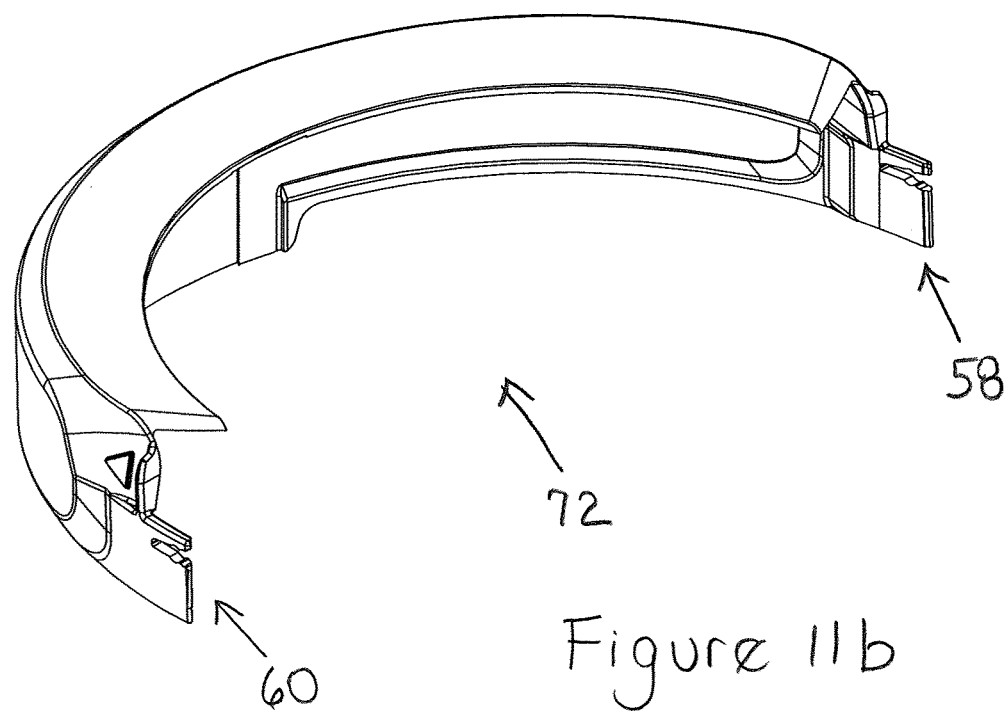

In an exemplary embodiment, as best shown in FIGS. 11a and 11b, the sensor cover 72 is operable to connect to the sensor base 70 and enclose the sensor assembly 32 and portions of the communications/power assembly 38. In an exemplary embodiment, the sensor cover 72 includes a sensor opening 78.

In an exemplary embodiment, as best shown in FIGS. 7a and 7b, the light portion 56 of the collar 30 is operable to house the light assembly 34 and portions of the communications/power assembly 38. In an exemplary embodiment, the light portion 56 of the collar 30 includes a light base 80 and a light cover 82.

In an exemplary embodiment, as best shown in FIGS. 8*a*, 8*b*, 12*a*, and 12*b*, the light base 80 is operable to support the light assembly 34 and portions of the communications/power assembly 38.

Figure 12A:
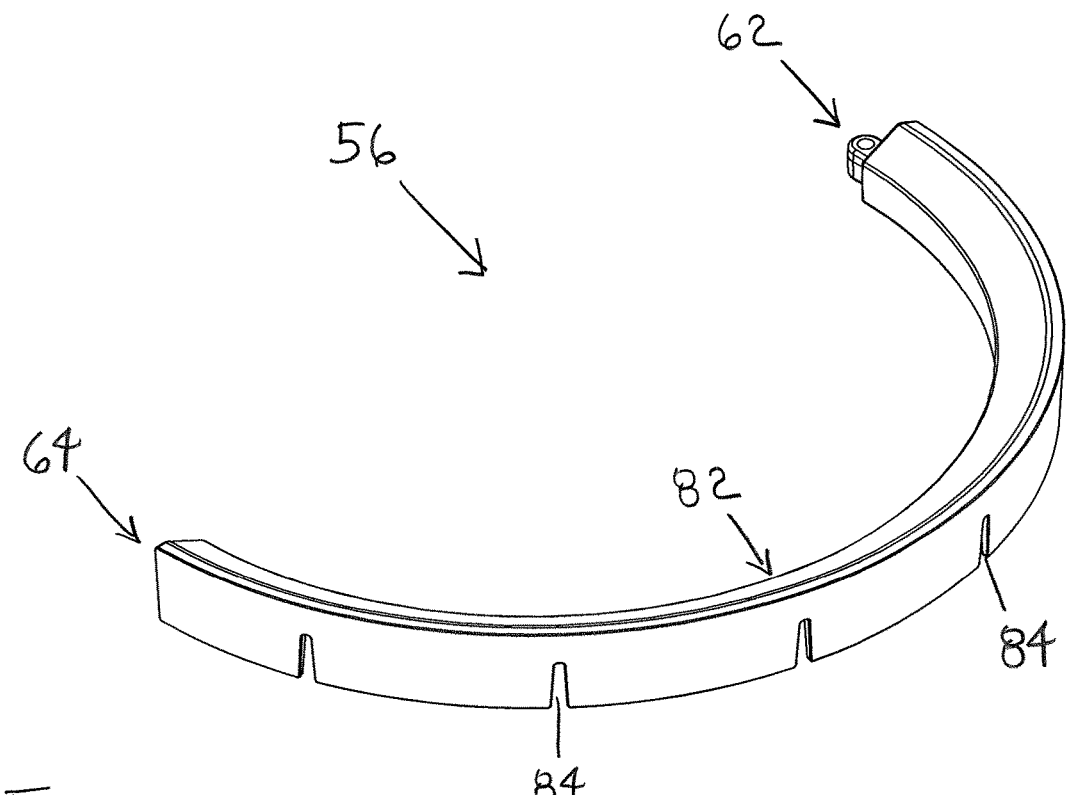
FIGS. 12a-12b are views of a light portion of the collar of FIGS. 7a-7b
Figure 12B:
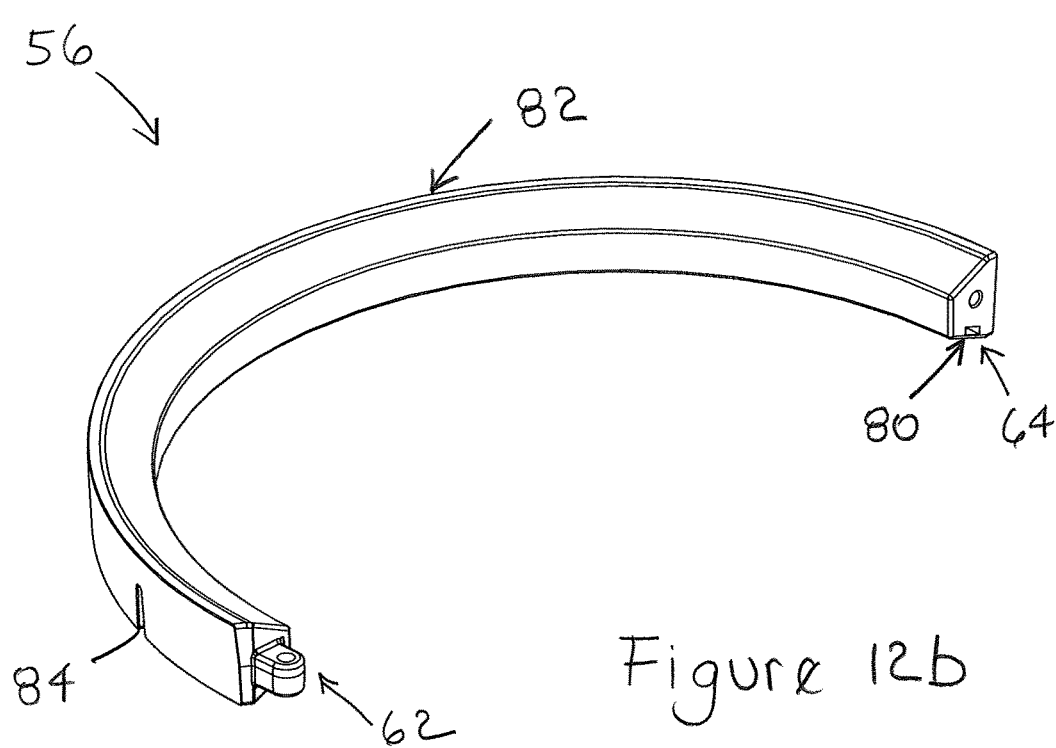

In an exemplary embodiment, as best shown in FIGS. 12*a* and 12*b*, the light cover 82 is operable to connect to the light base 80 and enclose the light assembly 34 and portions of the communications/power assembly 38. In an exemplary embodiment, the light cover 82 includes a light opening 84. In an exemplary embodiment, the light cover 82 includes a plurality of light openings 84.

In an exemplary embodiment, as best shown in FIGS. 1*a*, 1*b*, 2, 7*a*, 7*b*, 8*a*, and 8*b*, the sensor assembly 32 is operable to sense a presence of a user in a sensing zone in a first area near the disposal 12 and send a signal to the light assembly 34 indicating the presence of the user. In an exemplary embodiment, the sensor assembly 32 is operable to connect to the sensor base 70 of the collar 30 and be generally covered by the sensor cover 72 of the collar 30.

Figure 13A:
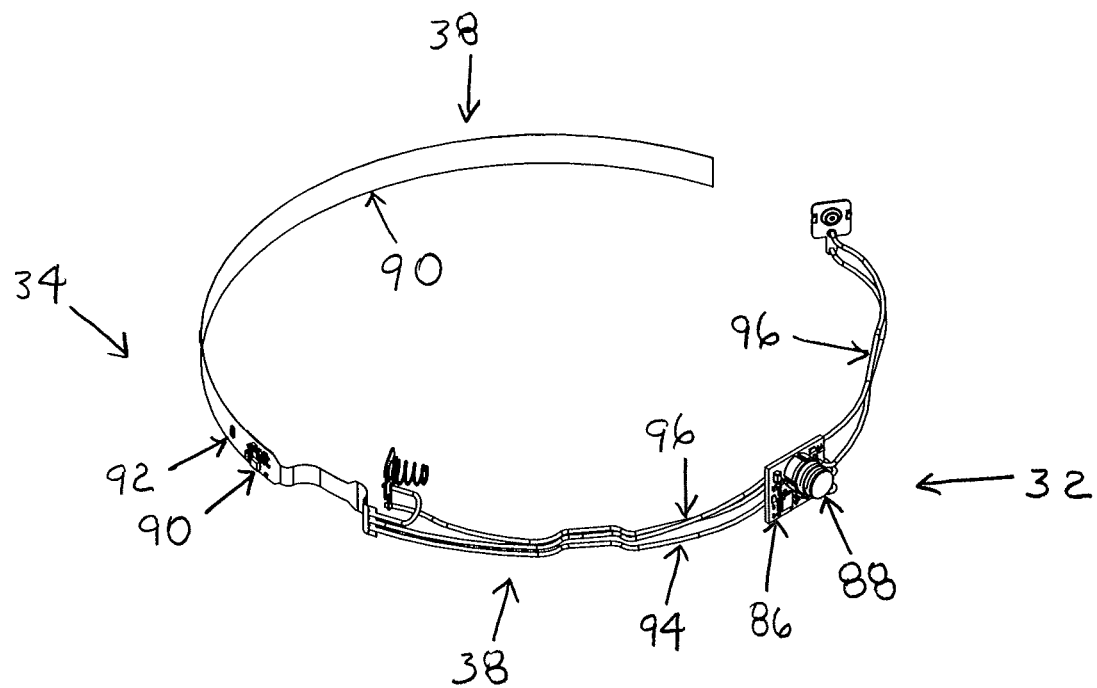
FIGS. 13a-13b are views of a communications/power assembly of the sensor and light system of FIGS. 7a-7b
Figure 13B:
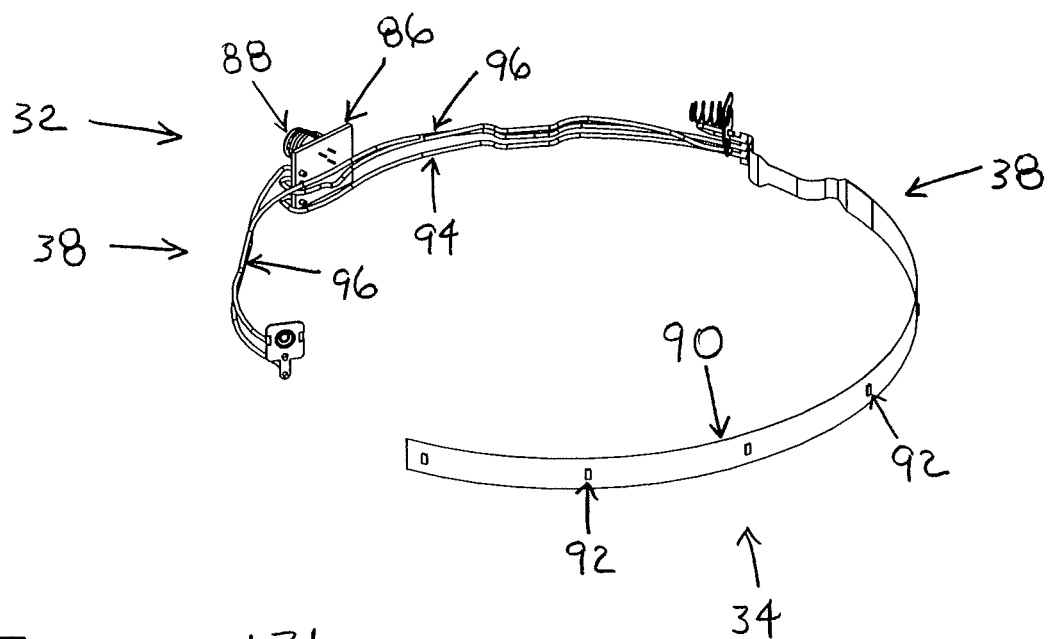
Figure 14:
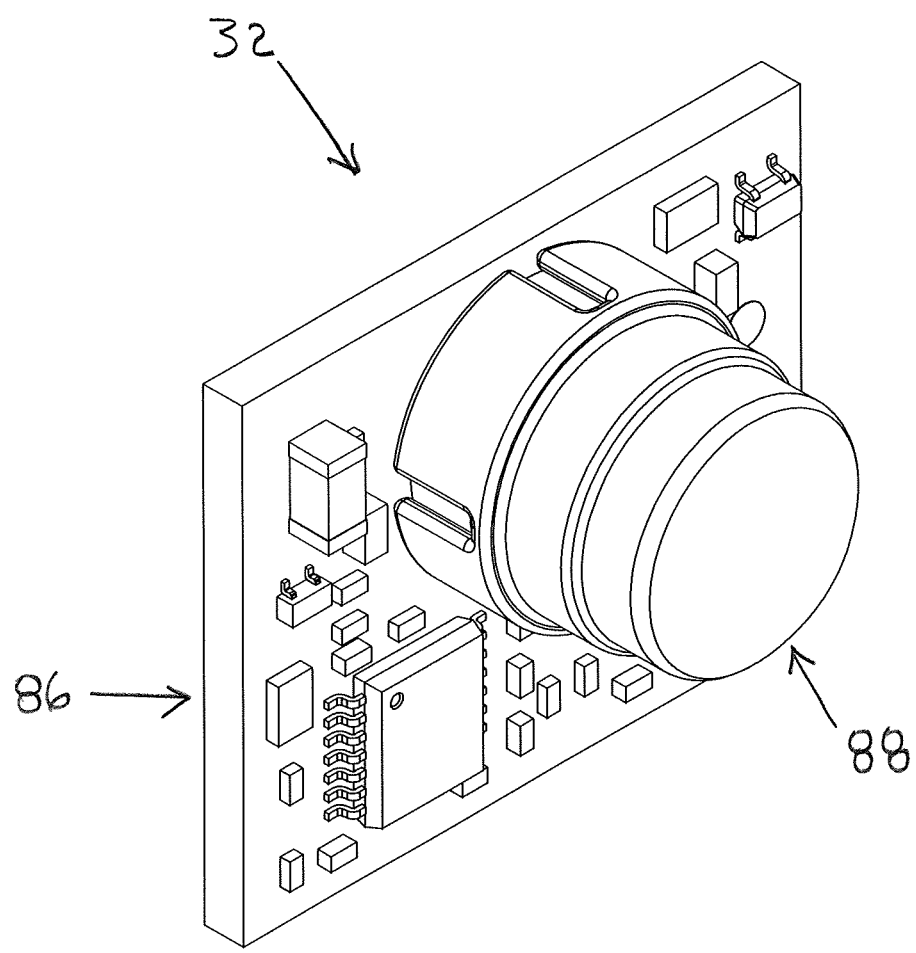
FIG. 14 is a front-left side perspective view of a sensor assembly of the sensor and light system of FIGS. 7a-7b.
Figure 15A:
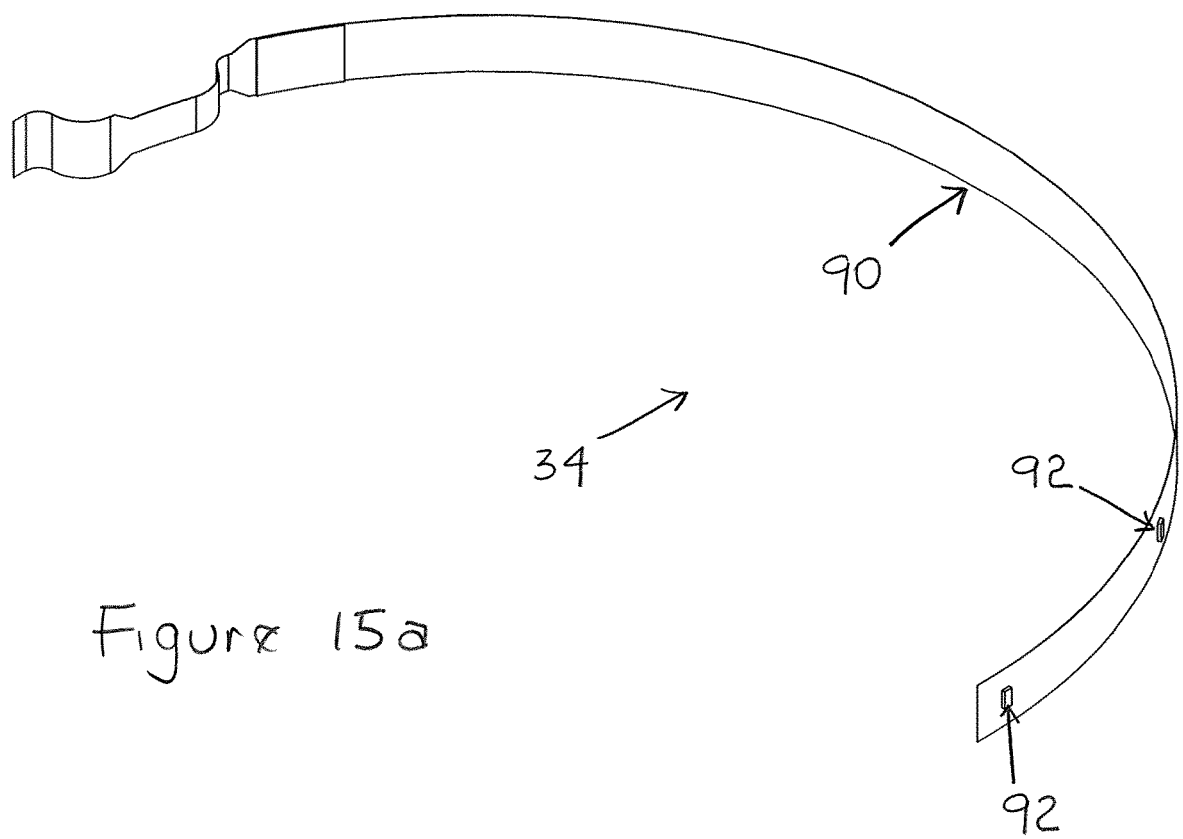
FIGS. 15a-15b are views of a light assembly of the sensor and light system of FIGS. 7a-7b
Figure 15B:
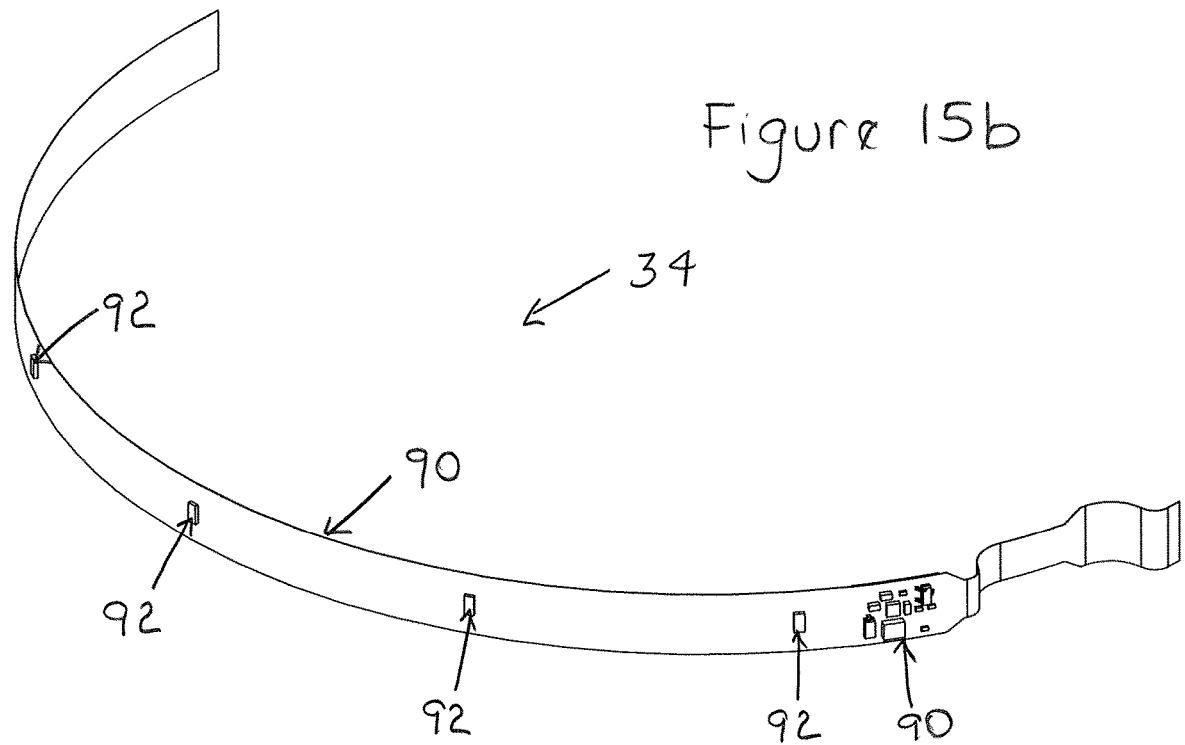

In an exemplary embodiment, as best shown in FIGS. 13*a*, 13*b*, and 14, the sensor assembly 32 includes a sensor control 86 and a sensor 88. In an exemplary embodiment, the sensor control 86 is operable to send the signal to the light assembly 34 indicating the presence of the user. In an exemplary embodiment, the sensor control 86 is a printed circuit board assembly ("PCBA"). In an exemplary embodiment, the sensor 88 is operable to sense the presence of the user. In an exemplary embodiment, the sensing zone includes an area generally at and below a level of the sensor 88. In an exemplary embodiment, the sensing zone excludes an area generally above the level of the sensor 88. In an exemplary embodiment, the sensor 88 is a presence sensor. As used herein, a presence sensor is any sensor that detects a presence of an object without any physical contact, such as by detection of and/or detection of changes in ambient light, heat, and/or motion. In an exemplary embodiment, the sensor 88 is a passive infrared ("PIR") sensor. However, one of ordinary skill in the art will appreciate that the sensor 88 could be any type of sensor that detects a presence of an object without any physical contact, such as by detection of and/or detection of changes in ambient light, heat, and/or motion. In an exemplary embodiment, the sensor 88 is mounted on the sensor control 86. In an exemplary embodiment, the sensor 88 is operable to extend through the sensor opening 78 in the sensor cover 72.

In an exemplary embodiment, as best shown in FIGS. 1*a*, 1*b*, 2, 7*a*, 7*b*, 8*a*, and 8*b*, the light assembly 34 is operable to receive the signal from the sensor assembly 32 indicating the presence of the user and illuminate a second area near the disposal 12. In an exemplary embodiment, the light assembly 34 is operable to connect to the light base 80 of the collar 30 and be generally covered by the light cover 82 of the collar 30. In an exemplary embodiment, the light assembly 34 is spaced apart from the sensor assembly 32. In an exemplary embodiment, the light assembly 34 is circumferentially opposed to the sensor assembly 32. In an exemplary embodiment including the collar 30, the light assembly 34 is spaced a fixed distance from the sensor assembly 32. In another exemplary embodiment including the collar 30', the light assembly 34 is spaced a variable distance from the sensor assembly 32.

In an exemplary embodiment, as best shown in FIGS. 13*a*, 13*b*, 15*a*, and 15*b*, the light assembly 34 includes a light control 90 and a light 92. In an exemplary embodiment, the light assembly 34 includes a plurality of lights 92. In an exemplary embodiment, the light control 90 is operable to receive the signal from the sensor assembly 32 indicating the presence of the user. In an exemplary embodiment, the light control 90 is a printed circuit board assembly ("PCBA"). In an exemplary embodiment, the lights 92 are operable to illuminate the second area near the disposal 12. In an exemplary embodiment, the lights 92 are operable to emit light through the light openings 84 in the light cover 82. In an exemplary embodiment, the lights 92 are light emitting diodes ("LEDs").

In an exemplary embodiment, as best shown in FIGS. 8*a*, 8*b*, 9*a*, 9*b*, 10*a*, 10*b*, 10*c*, and 10*d*, the power source 36 is operable to provide power to the sensor assembly 32 and the light assembly 34. In an exemplary embodiment, the power source 36 includes a plurality of batteries. In an exemplary embodiment, the power source 36 includes four AA batteries.

In an exemplary embodiment, as best shown in FIGS. 8*a*, 8*b*, 13*a*, and 13*b*, the communications/power assembly 38 is operable to electrically connect the sensor assembly 32, the light assembly 34, and the power source 36. In an exemplary embodiment, the communications/power assembly 38 includes a communications wire 94 and a power wire 96. In an exemplary embodiment, the communications wire 94 extends from the sensor control 86, to the first end 58 of the sensor portion 54 of the collar 30, and to the light control 90. In an exemplary embodiment, the power wire 96 extends from the battery compartment 74, to the sensor control 86, to the first end 58 of the sensor portion 54 of the collar 30, and to the light control 90.

In another exemplary embodiment including the collar 30', the communications/power assembly 38 is modified to accommodate the independent rotation of the sensor portion 54' and the light portion 56' of the collar 30'. For example, a communications wire and a power wire could extend between the sensor portion 54' and the light portion 56' of the collar 30'. Alternatively, battery contacts could extend between the sensor portion 54' and the light portion 56' of the collar 30'.

The disposal with sensor and light system 10 provides a number of advantages. These advantages include, but are not limited to, the following advantages. First, because the collar 30, 30' with the sensor assembly 32 and the light assembly 34 mounted thereon can rotate around the circumference of the disposal 12, the sensor 88 and the lights 92 can be aimed at desired locations. For example, the sensor 88 can be aimed at an area generally in a front of a cabinet in which the disposal 12 is mounted, and the lights 92 can be aimed at an area generally in a rear of the cabinet in which the disposal 12 is mounted. Further, the sensor 88 and the lights 92 can be aimed around other plumbing components or items in the cabinet in which the disposal 12 is mounted. Second, because the sensor assembly 32 and the light assembly 34 are or can be spaced apart on the collar 30, 30', the sensor 88 and the lights 92 can be aimed at separate locations. For example, the sensor 88 can be aimed at the area generally in the front of the cabinet in which the disposal 12 is mounted, and the lights 92 can be aimed at the area generally in the rear of the cabinet in which the disposal 12 is mounted. Third, because the battery compartment 74 is located near the sensor assembly 32 and moves with the sensor assembly 32, the battery compartment 74 can be located generally in the front of the cabinet in which the disposal 12 is mounted enabling easier access to the batteries for replacement. Fourth, because the battery compartment 74 is curved, the battery compartment 74 is compact and in-line with the sensor assembly 32. Fifth, because the sensor assembly 32 and the light assembly 34 are located in the track 48 that is in the upper portion 40 of the disposal 12, the sensor 88 and the lights 92 provide better detection and illumination.

The assembly and installation of the disposal with sensor and light system 10 will now be described. The sensor assembly 32 and portions of the communications/power assembly 38 are connected to the sensor base 70 of the collar 30, and the sensor cover 72 of the collar 30 is connected to the sensor base 70. The light assembly 34 and portions of the communications/power assembly 38 are connected to the light base 80 of the collar 30, and the light cover 82 of the collar 30 is connected to the light base 80. The sensor portion 54 of the collar 30 is connected to the light portion 56 of the collar 30 via the hinge 66. The shell 28 is connected to the disposal 12. More specifically, the lower portion 42 of the shell 28 is connected to the lower portion 26 of the disposal 12, and the first upper portion 44 and the second upper portion 46 of the shell 28 are connected to the upper portion 24 of the disposal. The collar 30 is placed in the track 48 of the shell 28. More specifically, the sensor portion 54 of the collar 30 is placed in the first track portion 50 of the shell 28, and the light portion 56 of the collar 30 is placed in the second track portion 52 of the shell 28. The second end 60 of the sensor portion 54 and the second end 64 of the light portion 56 are connected via the screw 68. The disposal 12 with the sensor and light system 14 connected thereto is mounted to a drain in a basin via the mount assembly 22. Similar assembly and installation steps would be taken for the disposal with sensor and light system 10'.

The use of the disposal with sensor and light system 10 will now be described. When the sensor and light system 14 is desired to be used, the sensor cover 72 of the collar 30 is disconnected from the sensor base 70 of the collar 30, the batteries 36 are placed in the battery compartment 74, and the sensor cover 72 is reconnected to the sensor base 70. The sensor portion 54 and the light portion 56 of the collar 30 can be rotated unitarily in the track 48 of the shell 28, so that the sensor 88 is aimed at the area generally in the front of the cabinet in which the disposal 12 is mounted, and the lights 92 are aimed at the area generally in the rear of the cabinet in which the disposal 12 is mounted. The sensor portion 54 and the light portion 56 of the collar 30 can also be rotated unitarily in the track 48 of the shell 28 so that the sensor 88 and the lights 92 are aimed around other plumbing components or items in the cabinet in which the disposal 12 is mounted. When the sensor 88 detects the presence of the user in the sensing zone in the first area near the disposal 12, the sensor control 86 sends the signal to the light control 90 indicating the presence of the user. When the light control 90 receives the signal from the sensor control 86 indicating the presence of the user, the lights 92 illuminate the second area near the disposal 12. The lights 92 remain illuminated for a predetermined period of time (e.g., for five seconds) after the sensor 88 no longer detects the presence of the user. However, one of ordinary skill in the art will appreciate that the lights 92 could remain illuminated for a different period of time (e.g., three second or ten seconds) after the sensor 88 no longer detects the presence of the user or the lights 92 could be illuminated for a predetermined period of time (e.g., thirty seconds) after the sensor 88 first detects the presence of the user. Similar use steps would be taken for the disposal with sensor and light system 10'. The primary difference for the disposal with sensor and light system 10' is that the sensor portion 54' and the light portion 56' of the collar 30' can be rotated independently in the track 48 of the shell 28. As a result, the area at which the sensor 88 is aimed can overlap, partially or completely, the area at which the lights 92 are aimed.

While the sensor and light system 14 has been shown and described in the illustrated embodiment as including certain components, one of ordinary skill in the art will appreciate that the sensor and light system 14 does not need to include each of these components and/or the specifics of each of these components.

For example, while the shell 28 has been shown and described as including the upper portion 40 and the lower portion 42, and more particularly as including the first upper portion 44 and the second upper portion 46, one of ordinary skill in the art will appreciate that the shell 28 could include any number of portions.

Similarly, while the collar 30, 30' has been shown and described as including the sensor portion 54, 54' and the light portion 56, 56', one of ordinary skill in the art will appreciate that the collar 30, 30' could include any number of portions.

Further, while the sensor portion 54, 54' and the light portion 56, 56' of the collar 30, 30' have been shown and described as being connected, to each other or individually, via hinges and screws, one of ordinary skill in the art will appreciate that the sensor portion 54, 54' and the light portion 56, 56' of the collar 30, 30' could be connected via any number of connection mechanisms.

Additionally, while the sensor assembly 32 has been shown and described as including the single sensor control 86 and the single sensor 88 and the light assembly 34 has been shown and described as including the single light control 90 and the plurality of lights 92, one of ordinary skill in the art will appreciate that the sensor assembly 32 and the light assembly 34 could include any number of these components.

Moreover, while the sensor portion 54, 54' and the light portion 56, 56' have been shown and described as including the separate sensor cover 72 and the separate light cover 82, one of ordinary skill in the art will appreciate that the sensor portion 54, 54' and the light portion 56, 56' could include integral covers.

One of ordinary skill in the art will now appreciate that the present invention provides a disposal with sensor and light system where a sensor detects a presence of a user in one area near the disposal and a light illuminates another area near the disposal. Although the present invention has been shown and described with reference to a particular embodiment, equivalent alterations and modifications will occur to those skilled in the art upon reading and understanding this specification. The present invention includes all such equivalent alterations and modifications.

What is claimed is:

1. A disposal sensor and light system, comprising:
   a shell, the shell operable to cover a portion of a disposal, the shell including a track, the track extending around a circumference of the shell;
   a collar, the collar operable to rotate in the track of the shell, the collar including a sensor portion and a light portion;
   a sensor assembly, the sensor assembly operable to sense the presence of a user in a sensing zone in a first area near the disposal, the sensor assembly operable to connect to the sensor portion of the collar; and
   a light assembly, the light assembly operable to illuminate a second area near the disposal, the light assembly operable to connect to the light portion of the collar;

wherein, by rotating the collar in the track of the shell, the sensor assembly can be aimed at the first area near the disposal and the light assembly can be aimed at the second area near the disposal.

2. The disposal sensor and light system of claim 1, wherein the collar can rotate around the circumference of the shell.

3. The disposal sensor and light system of claim 2, wherein the sensor portion and the light portion of the collar rotate unitarily.

4. The disposal sensor and light system of claim 2, wherein the sensor portion and the light portion of the collar rotate independently.

5. The disposal sensor and light system of claim 1, wherein:
the first area near the disposal is an area generally in a front of a cabinet in which the disposal is mounted; and
the second area near the disposal is an area generally in a rear of the cabinet in which the disposal is mounted.

6. The disposal sensor and light system of claim 1, wherein the sensing zone includes an area generally at or below a level of the sensor.

7. The disposal sensor and light system of claim 1, wherein the sensing zone excludes an area generally above a level of the sensor.

8. The disposal sensor and light system of claim 1, wherein:
the sensor assembly includes a sensor control and a sensor;
the light assembly includes a light control and a light; and
the sensor control is electrically connected to the light control.

9. A disposal sensor and light system, comprising:
a shell, the shell operable to cover a portion of a disposal, the shell including a track, the track extending around a circumference of the shell;
a collar, the collar operable to be received in the track of the shell, the collar including a sensor portion and a light portion;
a sensor assembly, the sensor assembly operable to sense the presence of a user in a sensing zone in a first area near the disposal, the sensor assembly operable to connect to the sensor portion of the collar; and
a light assembly, the light assembly operable to illuminate a second area near the disposal, the light assembly operable to connect to the light portion of the collar;
wherein the sensor assembly is spaced apart from the light assembly; and
wherein the sensor assembly and the light assembly can be aimed at different locations around the disposal.

10. The disposal sensor and light system of claim 9, wherein the sensor assembly is circumferentially opposed to the light assembly.

11. The disposal sensor and light system of claim 9, wherein the collar is operable to rotate in the track of the shell.

12. The disposal sensor and light system of claim 9, wherein:
the first area near the disposal is an area generally in a front of a cabinet in which the disposal is mounted; and
the second area near the disposal is an area generally in a rear of the cabinet in which the disposal is mounted.

13. The disposal sensor and light system of claim 9, wherein the sensing zone includes an area generally at or below a level of the sensor.

14. The disposal sensor and light system of claim 9, wherein the sensing zone excludes an area generally above a level of the sensor.

15. The disposal sensor and light system of claim 9, wherein:
the sensor assembly includes a sensor control and a sensor;
the light assembly includes a light control and a light; and
the sensor control is electrically connected to the light control.

16. A disposal sensor and light system, comprising:
a shell, the shell operable to cover a portion of a disposal, the shell including a track, the track extending around a circumference of the shell;
a collar, the collar operable to rotate in the track of the shell, the collar including a sensor portion and a light portion, the sensor portion including a battery compartment;
a sensor assembly, the sensor assembly operable to sense the presence of a user in a sensing zone in a first area near the disposal, the sensor assembly operable to connect to the sensor portion of the collar; and
a light assembly, the light assembly operable to illuminate a second area near the disposal, the light assembly operable to connect to the light portion of the collar;
wherein, when the collar is rotated in the track of the shell, the battery compartment moves around the disposal with the sensor assembly.

17. The disposal sensor and light system of claim 16, wherein the battery compartment is generally curved.

18. The disposal sensor and light system of claim 17, wherein:
the battery compartment includes a plurality of pairs of positive contacts and negative contacts;
the pairs of positive contacts and negative contacts are arranged end-to-end with positive contacts adjacent to negative contacts; and
the adjacent pairs of positive contacts and negative contacts are angled relative to each other.

19. The disposal sensor and light system of claim 16, wherein:
the sensor portion of the collar includes a first end and a second end;
the light portion of the collar includes a first end and a second end; and
the first end of the sensor portion is connected to the first end of the light portion via a hinge.

20. The disposal sensor and light system of claim 16, wherein:
the sensor portion of the collar includes a sensor cover, the sensor cover is operable to connect to the sensor base of the collar; and
the light portion of the collar includes a light cover, the light cover is operable to connect to the light base of the collar.

\* \* \* \* \*